(12) United States Patent  
Bisson et al.

(10) Patent No.: US 8,078,653 B1  
(45) Date of Patent: Dec. 13, 2011

(54) PROCESS FOR FAST FILE SYSTEM CRAWLING TO SUPPORT INCREMENTAL FILE SYSTEM DIFFERENCING

(75) Inventors: Timothy C. Bisson, Fremont, CA (US); Shankar Pasupathy, Sunnyvale, CA (US); Yuvraj Patel, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 564 days.

(21) Appl. No.: 12/247,174

(22) Filed: Oct. 7, 2008

(51) Int. Cl.  
*G06F 12/00* (2006.01)  
*G06F 17/30* (2006.01)  
*G06F 7/00* (2006.01)  
*G06F 17/00* (2006.01)  
*G06F 15/16* (2006.01)

(52) U.S. Cl. ........................................ 707/829; 707/641

(58) Field of Classification Search .................. 707/829, 707/641  
See application file for complete search history.

(56) References Cited

U.S. PATENT DOCUMENTS

| | | | |
|---|---|---|---|
| 5,909,677 A * | 6/1999 | Broder et al. | 707/1 |
| 6,292,830 B1 * | 9/2001 | Taylor et al. | 709/224 |
| 6,578,048 B1 * | 6/2003 | Mauldin | 707/10 |
| 2007/0288466 A1 * | 12/2007 | Bohannon et al. | 707/10 |
| 2008/0243770 A1 * | 10/2008 | Aasman | 707/2 |

* cited by examiner

*Primary Examiner* — Greta Robinson  
*Assistant Examiner* — Brian E Weinrich  
(74) *Attorney, Agent, or Firm* — Perkins Coie LLP

(57) ABSTRACT

A network storage server implements a method to perform fast crawling of a hierarchical storage structure. The hierarchical storage structure contains data entities stored by a network storage server. The hierarchical storage structure can be recursively divided into a plurality of sections. A plurality of parallel-processing threads can be used to process the plurality of sections. Each thread selects and processes one of the plurality of sections at a time to generate a sorted list of metadata corresponding to the section of the hierarchical storage structure. The sorted lists generated by the plurality of threads are merged to a baseline list. The baseline list contains sorted metadata for entities managed by the hierarchical storage structure. The baseline list can then be outputted as a representation of the state of data stored by the network storage server.

22 Claims, 5 Drawing Sheets

US 8,078,653 B1

PROCESS FOR FAST FILE SYSTEM CRAWLING TO SUPPORT INCREMENTAL FILE SYSTEM DIFFERENCING

FIELD OF THE INVENTION

At least one embodiment of the present invention pertains to network storage systems, and more particularly, to a process for fast crawling of a hierarchical storage structure.

BACKGROUND

A storage server is a computer system that is used to store and retrieve data on behalf of one or more clients on a network. A storage server typically stores and manages data in a set of mass storage devices, such as magnetic or optical storage-based disks or tapes. In conventional network storage systems, the mass storage devices may be organized into one or more groups of drives (e.g., redundant array of inexpensive drives (RAID)).

A storage server may be configured to service file-level requests from clients, as in the case of file servers used in a Network Attached Storage (NAS) environment. Alternatively, a storage server may be configured to service block-level requests from clients, as done by storage servers used in a Storage Area Network (SAN) environment. Further, some storage servers are capable of servicing both file-level and block-level requests, as done by certain storage servers made by NetApp®, Inc. of Sunnyvale, Calif.

To facilitate data access, a file system can be implemented to logically organize the data stored in a storage server's underlying NAS or SAN environment. The contents of the file system are often indexed for searching or monitoring purposes. In order to provide a complete and up-to-date overview of the contents of the file system, a "crawling", or scanning, of the file system is periodically performed by a crawler processor. During crawling, various information about the contents of the file system can be acquired. However, the speed of a file system crawler is often inadequate, especially when indexing a large-scale storage system which can contains millions of files with storage sizes in petabytes.

Further, the performance cost of periodically crawling an entire file system is often disproportionate to the rate of change of the file system. Even if there is only one file being updated after a prior crawl, the file system needs to be crawled completely in order to determine which file has changed. One approach to eliminate a complete re-crawling is to require all applications to notify the file system whenever a file is updated by the applications. However, on a large, enterprise file system, the overhead from keeping track of all the file-updating notifications can be overwhelming. Also, such approach requires modification of every file-updating application with notification functionalities. Another approach is to modify the file system to generate a log each time the file system detects a file changing event. The log is then leveraged by an indexing service to determine the files to be re-indexed. However, such approach may require updating of the file system software in order to accommodate such functionality. To further complicate matters, the above approaches can incur a significant amount of latency and therefore significantly reduce a crawler's performance.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
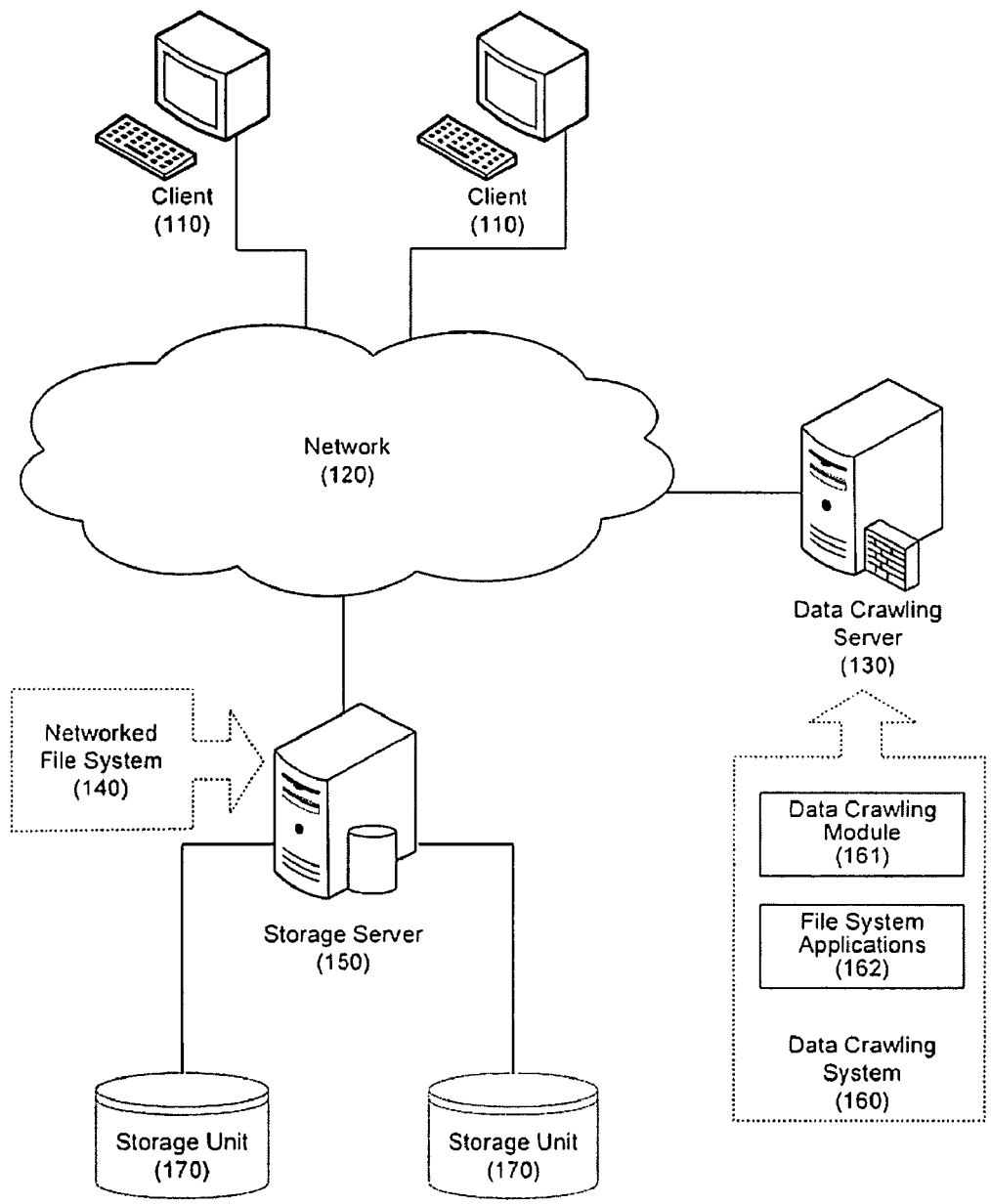
FIG. 1 illustrates a network storage system in which the present invention can be implemented.

A method and apparatus for providing a fast crawling approach are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

To reduce time spent on crawling a large file system, or any large-scale hierarchical data storage structure, a fast crawler can be implemented to "divide" the large-scale structure into multiple subsections, and "conquer" the large-scale structure by parallel-processing the subsections to generate sub-results that can be combined into a complete result. A large-scale hierarchical storage structure can be logically divided into multiple subsections since entities within the structure are stored in a multi-leveled, interconnected organization. For example, the World Wide Web is a hierarchical structure with information stored in web pages, and with URL links linking these web pages to form infinite levels of traverse-ability. A web crawler can divide the World Wide Web by the web sites the web pages are located on, and simultaneously scan the web pages in each web site to obtain a copy of, or extract information from, the visited web pages. The obtained information from each web site can then be combined and further processed, for example, by a search engine for indexing.

Similarly, by dividing a large-scale network-based file system into subsections, a fast crawler can significantly reduce the time spent on a complete crawling of the file system. A network-based file system can manage data stored in files or blocks. When stored in file entities, data can be organized into a structure formed by directories and files, with each of the directories potentially including additional files and subdirectories. When using block entities, data can be organized into a structure formed by volumes, Logic Unit Numbers (LUNs), disks, and/or slices, etc. Thus, the network-based file system can be "divided" based on organizational entities such as directories, volumes, disks, etc. For each divided subsection of the file system, the fast crawler traverses through the subsection and generate a list of metadata for entities contained within the subsection. The generated lists of metadata from some or all subsections can then be combined and further processed, for example, to enable quick incremental differencing in comparison to a baseline, etc.

In one embodiment of the technique introduced here, a network-based file system supports simultaneous processing of its hierarchical storage structure by allowing concurrent accessing. By taking advantage of this concurrency accessibility, a fast crawler instantiates multiple parallel-processing threads, assigns each of the threads a subsection of the hierarchical storage structure, and instructs these threads to concurrently access the file system and crawl their corresponding subsections. Each thread evaluates the entities or sub-structures contained in the corresponding section, and extracts metadata and/or contents from these entities. With the helps of multi-threading, the time spent on crawling a large-scale file system can be significantly reduced.

In one embodiment, the multiple sections of a hierarchical storage structure can be recursively divided and distributed to the threads via a global queue. A global queue is a storage unit which contains a list of leads for accessing the subsections of the hierarchical storage structure. A lead can be a reference to one of the subsections, which in turn can be used to provide a thread a direct access to the subsection. Each of the threads shares an access to the global queue in order to retrieve a lead from the global queue. For examples, if the hierarchical storage structure contains directories, then each of the directories can be a lead for crawling files within the directory. During processing, a thread fetches and removes a lead from the global queue, and starts to crawl the section of hierarchical storage structure referenced by the lead. The newly discovered leads, such as sub-directories underneath a currently-being-crawled directory, can be recursively added to the global queue and can be subsequently processed by other threads.

In one embodiment, metadata collected by a fast crawler thread is appended to a memory buffer associated with the thread. When the buffer becomes full, the thread sorts the entries in the buffer by mode number or any other unique identifiers. Once sorted, the entries in the buffer are transferred to a unique sorted list. The sorted list can be either maintained in the memory, or saved to a file. The threads can also be used to merge, in parallel to the crawling, these sorted lists into a merged sorted list. Once all sorted lists are merged into one single list, this single sorted list, which includes metadata for all entities in a hierarchical storage structure, can be used as a baseline file. When compared with other earlier baseline files, the new baseline file can be used to generate incremental differences occurred since the generation of the earlier baseline files. A delta file can then be used to save these incremental differences, which include entity creation, modification, and/or deletion detected during the comparison. Because the baseline files are sorted, comparison of the baseline files and generating of the delta file can be accomplished quickly and efficiently. The delta file can then be further used for specific indexing or querying purposes. The delta file can also be compared with other baseline files or delta files for various other purposes.

In one embodiment, the fast crawler can process special-case entities encountered during the crawling. For example, multiple hard links (independent references to data) can be evaluated not only based on mode number of the hard links, but also on additional hard link information such as file name, etc. As another example, a volume and a LUN may require different crawling operations, etc. In addition, to further improve the performance of the fast crawler, the number of threads, the size of the memory buffer for each thread, and other aspects of the fast crawler can be configured or tailored based on available system resource, such as CPU and/or memory, etc.

Refer now to FIG. 1, which shows a network storage environment in which the present invention can be implemented. In FIG. 1, a storage server 150 providers data storage services to a set of clients 110 via a network 120. The network 120 may be, for example, a local area network (LAN), wide area network (WAN), metropolitan area network (MAN), global area network such as the Internet, a Fibre Channel fabric, or any combination of such interconnects. Each of the clients 110 may be, for example, a conventional personal computer (PC), server-class computer, workstation, handheld computing or communication device, or the like.

In one embodiment, the storage server 150 manages multiple storage units 170 that include non-volatile mass storage devices (not shown). The storage server 150 receives and responds to various read and write requests from the clients 110, directed to data stored in or to be stored in the storage units 170. The storage units 170 can include, for example, conventional magnetic or optical disks or tape drives; alternatively, they can include non-volatile solid-state memory, such as flash memory. The mass storage devices in storage units 170 can be organized as a Redundant Array of Inexpensive Disks/Devices (RAID), in which case the storage server 150 accesses the storage units 170 using one or more well-known RAID protocols.

In one embodiment, the storage server 150 can be a file-level storage server such as used in a NAS environment, a block-level storage server such as used in a SAN environment, or a storage server which is capable of providing both file-level and block-level service. Further, although the storage server 150 is illustrated as a single unit in FIG. 1, it can have a distributed architecture. For example, the storage server 150 can be implemented with multiple distributed storage servers. It can also include a physically separate network module (e.g., "N-module") and disk module (e.g., "D-module") (not shown), which communicate with other storage servers over an external interconnect. The N-module acts as a front-end of the storage server, exporting services to clients; and the D-module acts as the back-end, managing the underlying storage of the storage server. The N-module and D-module can be contained in separate housings and communicate with each other via network connections. Either the N-module or the D-module can implement a fast crawler to support incremental crawling of a hierarchical storage structure. Thus, the N-module and the D-module enable a storage server to be physically separated into multiple modules that can be distributed across a network. In one embodiment, a storage server 130 can include multiple N-modules and D-modules, each of the N-modules corresponding to one or more D-modules, and each of the D-modules corresponding to one or more N-modules.

In one embodiment, a networked file system 140 can be implemented in the storage server 150. The networked file system 140 performs data management and services client-initiated data access requests (among other operations). Regardless of whether data is stored in file-level or block-level units in the storage server 150, the networked file system 140 is responsible for providing easy and fast access to these data. In addition, a networked file system 140 can be used to organize and represent access to any data, whether it is stored or dynamically generated. Examples of a networked file system include NFS (Network File System), AFS (Andrew File System), SMB (Server Message Block), CIFS (Common Internet File System), HTTP-based (Hypertext Transfer Protocol based), and/or iSCSI-based (Internet small computer system interface based), etc. In FIG. 1, a networked file system 140 is shown to be installed in the storage server 150. Alternatively, the networked file system 140 can be installed in a client 110 or distributed between the clients 110 and the storage server 150.

In one embodiment, the networked file system 140 manages one or more hierarchical storage structures. A hierarchical storage structure makes all data units appear to exist in one or more hierarchies. Taking an example of a UNIX-like file structure, local files managed by a networked UNIX file system are all located under one root directory. The root directory can be stored in a physical storage device or maintained in a networked shared resource, e.g., memory, etc. Each file in the UNIX-like file structure has a file name, an mode number, and other metadata. Under each directory, including the root directory, are zero or more files or sub-directories. Another example is a structure formed by hierarchies of volumes, logic unit numbers (LUNs), disks, slices, and/or blocks, etc. Also, a hierarchical structure can be formed by web pages with URL links linking the pages. In this case, the networked file system 140 can also provide HTTP access to these web pages.

In one embodiment, the networked file system 140 allows shared and simultaneous access to data stored in a network storage server 150. For data requests simultaneously received from multiple clients 110, the networked file system 140 is capable of parallel-processing these data requests, especially when there are no data contentions. When multiple data requests try to concurrently update a shared data, the network file system 140 manages the concurrency issues to ensure data consistency. In one embodiment, data managed by the networked file system 140 can be divided into multiple sections. By taking advantage of the parallel-processing capability of the networked file system 140, each of the divided sections can be simultaneously accessed and processed by a crawler with multiple threads. And the results of these processing can be reassembled to form a complete result, as if the data is processed as a whole, by one processor, to generate such a result.

In FIG. 1, a networked configuration is implemented for providing fast file system crawling. In one embodiment, the file system crawling configuration is implemented by a Data Crawling server 130 running a data crawling system 160. The Data Crawling system 160 utilizes the data crawling module 161 to access the storage server 150 and the networked file system 140, and the outcome of the crawling module 161 can be further processed by file system applications 162. Alternatively, the data crawling module 161 can also be implemented in a storage server 150, or in any system with access to the networked file system 140. Further, the data crawling module 161 and/or the file system applications 162 can be implemented in a client 110. In such a configuration, the generated outputs can be presented to a user via a user interface on the client 110. The data crawling module 161 can also crawl multiple networked file systems 140 simultaneously.

Figure 2:
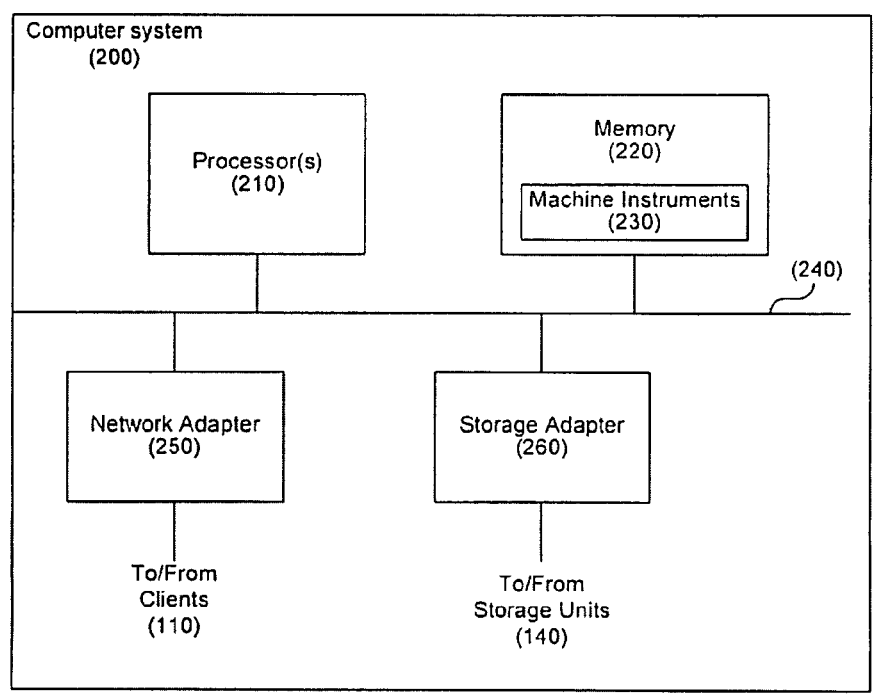
FIG. 2 is a high-level block diagram showing an example of the architecture of a storage server.

FIG. 2 is a high-level block diagram showing an example of the architecture for a computer system 200 that can be utilized to implement a storage server 150, a data crawling server 130, or a client 110 of FIG. 1. In FIG. 2, the computer system 200 includes one or more processors 210 and memory 220 connected via an interconnect 240. The interconnect 240 is an abstraction that represents any one or more separate physical buses, point-to-point connections, or both connected by appropriate bridges, adapters, or controllers. The interconnect 240, therefore, may include, for example, a system bus, a Peripheral Component Interconnect (PCI) bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 210 may include central processing units (CPUs) of the storage server 130 and, thus, control the overall operation of the storage server 130. In certain embodiments, the processor(s) 210 accomplish this by executing software or firmware stored in memory 220. The processor(s) 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 220 is or includes the main memory of the computer system 200. The memory 220 represents any form of random access memory (RAM), read-only memory (ROM), flash memory (as discussed above), or the like, or a combination of such devices. In use, the memory 220 may contain, among other things, a set of machine instructions 230 which, when executed by processor 210, causing the processor 210 to perform operations to implement embodiments of the present invention. In an embodiment in which a computer system 200 is implemented as a storage server 150, machine instructions 230 can include a networked file system 140 for the storage server. When a computer system 200 is implemented as a data crawling server 130, the memory 220 includes machine instructions 230 for implementing a data crawling system 160 of FIG. 1.

Also connected to the processor(s) 210 through the interconnect 240 are a network adapter 250 and a storage adapter 260. The network adapter 250 provides the computer system 200 with the ability to communicate with remote devices, such as clients 110, and/or other storage server 150 over the network 130 of FIG. 1, and may be, for example, an Ethernet adapter or Fibre Channel adapter. In one embodiment, the network adapter 250 is connected to the network 130 of FIG. 1, to process data crawling messages sent from the data crawling server 160. In a storage server 150, the storage adapter 260 allows the computer system to access the storage units 170 and may be, for example, a Fibre Channel adapter or a SCSI adapter.

Figure 3:
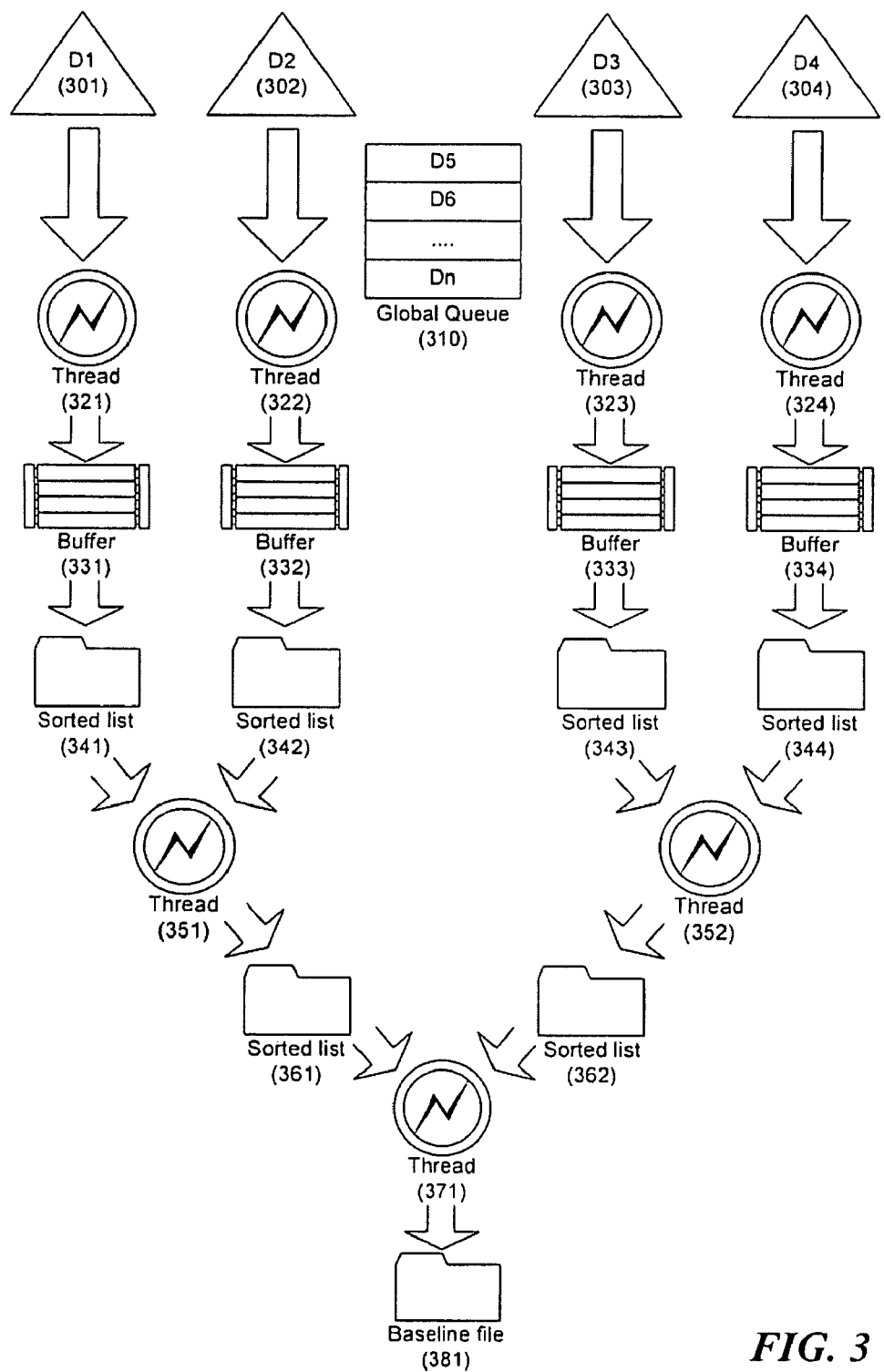
FIG. 3 illustrates a fast crawling scenario.

FIG. 3 schematically illustrates a process for fast crawling a hierarchical storage structure, in accordance with certain embodiments of the present invention. In FIG. 3, multiple threads 321-324, 341, 342, and 361 of a fast crawler are instantiated by a data crawling module 161 of FIG. 1, and are ready to process a hierarchical storage structure (not shown in FIG. 3). A thread is a mechanism for replicating a software process into multiple simultaneously running tasks. Since a thread is contained inside a process, and different threads in the same process can share system resources, utilizing multithreading techniques allows the parallel execution of multiple tasks, thereby taking advantage of a multiprocessor or multi-core computer system. Also, comparing to multi-processing, multithreading takes less computing resources, and therefore consumes less system resources, runs more efficient, and launches more quickly.

In one embodiment, to take advantage of the concurrent accessibility of the network file system in which a hierarchical storage structure is stored, the hierarchical storage structure to be crawled is divided into multiple sections, such as 301-304 of FIG. 3. In one embodiment, when the hierarchical storage structure is a UNIX or MS WINDOW like file system, the structure can be divided directory by directory Likewise, when the hierarchical storage structure is block based, the structure can be divided volume by volume, or disk by disk, etc. Each of the divided sections is associated with a lead. A lead references a section of the hierarchical storage structure and provides a direct access to the section. For example, the name of a directory or a volume can be a lead. As long as a dividing scheme does not cause any missing or overlapping of data, such scheme can be used in supplying leads to the threads for parallel-processing of the hierarchical storage structure.

In one embodiment, before starting up the threads 321-324 for processing, a preliminary set of leads is added to a global queue 310. The global queue 310 is shared by each of the threads 321-324, and can be implemented with volatile memory, or non-volatile storage, etc. From the perspectives of the threads 321-324, the queue 310 is "globally" accessible. However, the global queue 310 may or may not be accessible by other processors or threads. The entries in the global queue 310 provide starting points for crawling a hierarchical storage structure. For example, the name of a root directory, which is the highest-level directory for a local file system, can be added as the first entry in the global queue 310. The root directory provides a lead to access all files and sub-directories underneath the root directory. Alternatively, a list of network computer names with corresponding directory names can be added to the global queue 310. The network computer names can represent unique storage servers accessible by the threads, and the corresponding directory names can be root directories or starting directories of the networked file systems installed on these unique storage servers. Further, identifiers for sub-directories underneath a root directory, files, volumes, disks, etc, can also be included in the global queue 310. Therefore, having a global queue 310 allows configurability and flexibility in file system crawling.

In one embodiment, multiple threads 321-324 are instantiated. Each of the threads 321-324 can perform some or all of the crawling functionalities. After instantiation, in order to control concurrent access to the global queue 130, a mutual exclusive lock can be implemented to "lock" the global queue 130, so that only one thread at a time can have an exclusive access to the global queue 310. Once a thread obtained the exclusive access to the global queue 310, all other threads must wait and retry their attempts to access the global queue 310. The thread which obtains access may read, and afterward remove, the first lead from the global queue 310. After obtaining a lead for processing, the thread releases the exclusive lock on the global queue 310, allowing other threads to obtain leads for processing. If there are no more leads in the global queue 310, each of the non-processing threads may wait for a predetermined amount of time to retry the above process. The predetermined amount of time, e.g., in seconds or milliseconds, can be configured either by a user or by default prior to or during the crawling. Alternatively, the wait time for the non-processing threads can be randomly assigned, thereby minimizing the possibility of deadlocking. In the example illustrated in FIG. 3, four leads D1, D2, D3 and D4 are obtained by four threads 321-324 to process four sections 301-304 of a hierarchical storage structure; each of the sections 301-304 can represent for example, a directory of a file system; and the global entry 310 contains additional leads such as D5, D6 . . . Dn.

In one embodiment, after obtaining a directory lead, such as one of the D1-D4, for processing, a thread starts to scan the corresponding directory. A system call similar to a UNIX readdir( ) returns a sequence of all the entities in this particular directory. For each returned entity, an inquiry similar to a UNIX system call stat( ) can be invoked upon the entity to obtain metadata about the entity. Metadata are data describing the entity of a hierarchical storage structure. Metadata about an entity can usually be obtained from the networked file system or the hierarchical storage structure, without physically accessing the content of the entity. Examples of the metadata that can be extracted from a file include: mode number; created flag, modified flag, deleted flag, full path name, file extension, file size, soft or hard link, file or directory, user id, group id; hard link count; create time, access time, or modified time, etc. Metadata for a block can include block id, size, location, access information, etc. Alternatively, an additional call can be made to open an entity and access the content of the entity. For example, specific operations can be performed to specific types of files, e.g., image, audio, video files, etc, to extract metadata embedded in these special files.

In one embodiment, after one of the threads 321-324 processes an entity, the resulting metadata is appended to one of the in-memory buffers 331-334 associated with the processing thread. Each of the buffers 331-334 has a fixed size, and can be implemented by a volatile or a non-volatile memory. Once a buffer is full, the entries in the buffer are sorted by the processing thread based on one or more criteria. For example, entries can be sorted by inode number (a unique identifier for file or directory), by accessing time, or by other metadata information. The sorting can be accomplished by using merge-sort or any high performance sorting algorithm. Since the entries are in memory, the sorting usually can be accomplished quickly.

After sorting, the entries in a buffer can be saved by the sorting thread to one of the sorted lists 341-344. In one embodiment, each of the sorted lists 341-344 is a unique output file associated with the processing thread. The uniqueness of the output file can be ensured by assigning a file name with thread number and/or iteration number of the thread. Once saved, the processing thread clears the buffer, and continues the crawling of the rest of directory for additional entities. In an example illustrated in FIG. 3, a set of sorted lists 341-344 is generated while the threads 321-324 are continuing processing structures 301-304. Thus, every time a thread's buffer becomes full, the thread repeats the above sorting and saving steps.

In one embodiment, a thread may discover one or more sub-directories in its crawling directory. The names of the newly discovered sub-directories are added as new leads to the global queue 310, and the new leads can be processed by any awaiting threads. Also, once a processing thread finishes crawling a directory, it can also obtain a new lead from the global queue 310 to repeat the above processing. The process of adding leads to the global queue 310 is similar to the process of obtaining and removing a lead from the global queue 310. After requesting and obtaining a mutual exclusive lock on the global queue 310, the leads for the newly found sub-directories are appended to the global queue 310.

In one embodiment, if each thread picks the first lead from the global queue 310, the cumulative effect resembles a width-first crawling, since the directory referenced by the first lead tends to be discovered earlier, and is therefore at a relatively top level in the hierarchical structure. Alternatively, if each thread picks the last lead from the global queue 310, the effect can be a depth-first crawling, since the directory referenced by the last lead is most recently discovered, and is likely to be at a lower level in the hierarchical structure. After all the leads in the global queue 310 are processed, each of the threads 321-324 stops its operations, and can be terminated either by itself or by external instructions.

In one embodiment, a separate set of threads such as threads 351, 352, and/or 371 can be instantiated to merge the sorted lists 341-344 into a single list. Alternatively, while waiting for new leads in the global queue 310, threads similar to threads 321-324 can also be used for merging the sorted lists 341-344. Each of the threads 351, 352 merges two sorted lists into one merged list, and stores the merged list as one of the intermediate sorted lists such as 361-362. A thread 371 may further merge two intermediate sorted lists 361 and 362 into a sorted list 381. If there are no more sorted lists to be merged, then the sorted list 381 becomes a baseline file, which contains crawled metadata for all entities in a hierarchical storage structure. FIG. 3 illustrates an example in which four sorted lists are merged into one baseline file 381. In case there are more sorted lists to be merged, more threads may be involved in the merging, and more merging iterations are required as long as there is more than one sorted list available for merging.

One approach is to have all the files and sub-directories crawled, and the crawled outcomes are all flushed out of the buffers and stored in the sorted lists such as 331-334 before having the threads to start the merging process. Such approach is advantageous since most of the initial sorted lists are in similar size, and merging of similar sized sorted lists often yields a higher performance. Alternatively, the initial sorted lists 341-344 are merged as soon as they are created. For example, after being created, sorted list 341 and 342 can be merged by a thread 351 to a sorted list 361. The sorted list 361 might be merged with a later generated sorted list 343, which might be smaller in size than the sorted list 361. Such an approach requires more system resources, but the whole crawling process might finish quicker than starting the merging after all sorted lists are generated.

In one embodiment, once no more sorted list can be paired for merging, the last sorted list is a baseline file. The baseline file provides a moment-in-time (the moment when the structure is crawled) overview of the entities in the hierarchical storage structure. The baseline file is valuable because it is a flattened representation of the hierarchical storage structure, with all the entities in the hierarchical storage structure listed and sorted. The baseline file can then be further processed, e.g., compared with other baseline files generated in a prior time, etc.

In one embodiment, extracting differences between two baseline files, or creating delta files, can be efficiently accomplished when both baseline files are sorted. The two baseline files are loaded into memory as two sorted lists. If the baseline files cannot be fully loaded into memory at the same time, then the baseline files can be loaded section by section in its sorted order. Two pointers, one for each sorted list, represent an index into each of the sorted lists. The two sorted lists are traversed by moving their respective pointers along the lists. During traversing, two entries of the two sorted lists, referenced by the two pointers, are compared based on their sorted criterion. If the sorting criterion is based on mode number, then the comparing routine compares mode number for the two entries referenced by the two pointers. An equal result from the comparison When the two entries are found to be equal during comparison, it means an entity is present in both baseline files, and both pointers can be incremented to check additional entries. If the comparison does not find equality, then one or both of the pointers can also be incremented to reference the following entries in both baseline files. When the two pointers reach the end of both sorted lists, the algorithm has completed a differencing of the two baseline files. If an entry is found in the newer baseline file but not in the older baseline file, such entry represents a newly created file or directory. Similarly, any entry existing in the older baseline file, but not in the newer baseline file, indicates the file or directory represented by the entry is deleted. If the two mode numbers at their relative indexed position are the same, then further comparisons are performed on other respective metadata for the entries. For example, if any metadata, other than access time, is changed, then a modification is presumed to have occurred. For each creation, modification, or deletion of entry extracted from the comparison, the entry's metadata information, including its full path, an indication of creation, modification or deletion, etc, are extracted from the baseline files and recorded in the delta file. For entries deleted in the new baseline file, the metadata information is obtained from the older baseline file. For creation, the metadata information is obtained from the newer baseline file.

In one embodiment, once a delta file is generated base on comparison of the baseline files, the delta file can be further processed. For a search indexing application, entries in the delta file can represent the recent changes occurred between two crawls. The indexing application can then re-index the updates, which is much more efficient than re-indexing the whole file system. Also, additional analysis can be performed on a single baseline file. For example, a count of total number of entities in a file system can be quickly accomplished by counting the number of entries in the baseline file. Further, the baseline file can also be useful for restoring a file system, converting one file system to another, and importing and exporting a file system, etc. In one embodiment, the addition processing of the baseline file can be performed by file system application 162 of FIG. 1.

Figure 4:
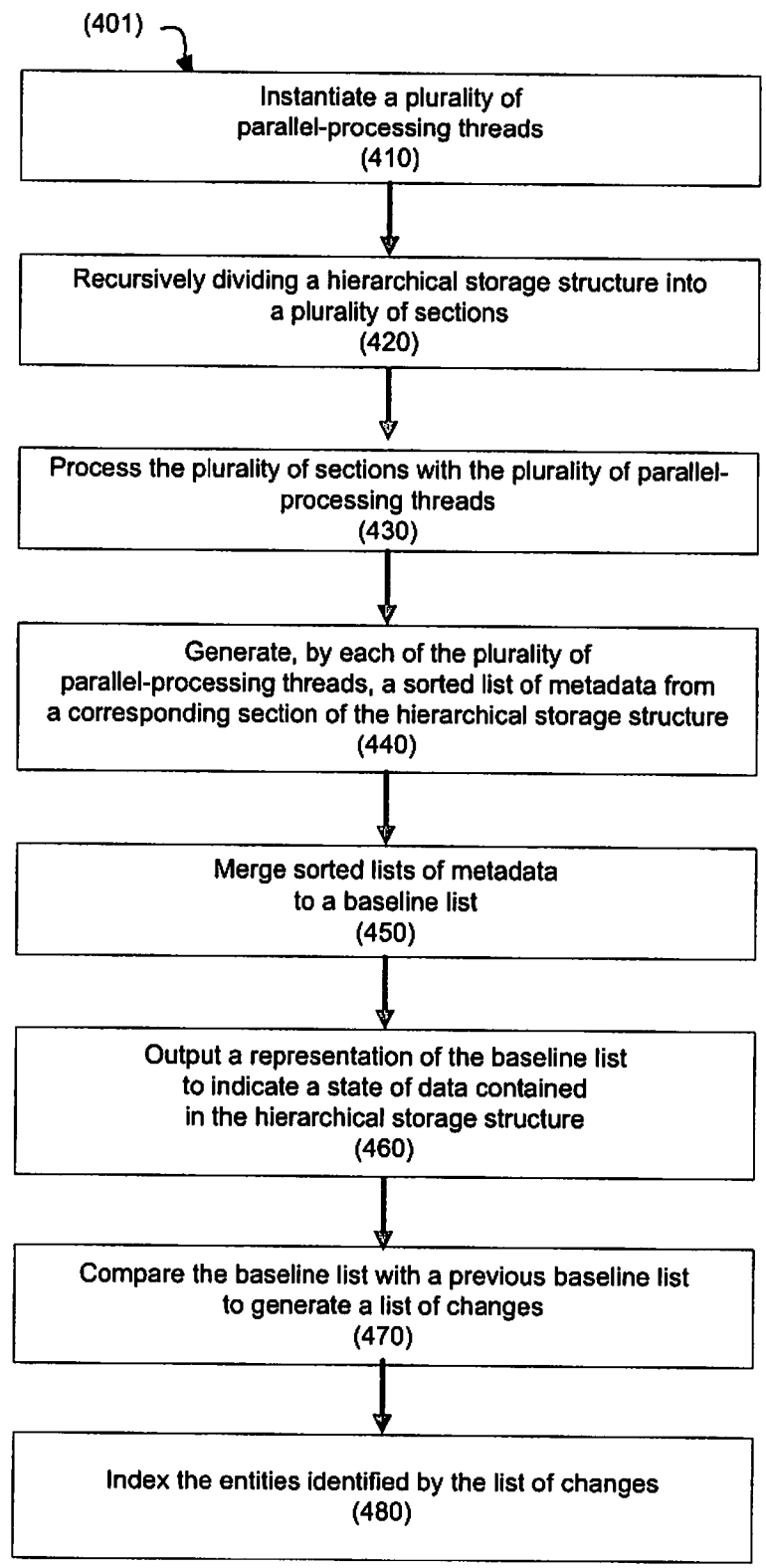
FIG. 4 is a flow diagram showing a process in a computer system for fast crawling a hierarchical storage structure.

FIG. 4 illustrates a flow diagram of a process 401 for fast crawling a hierarchical storage structure, in accordance with certain embodiments of the present invention. The process 401 can be performed by processing logic that may comprise hardware (e.g., special-purpose circuitry, dedicated hardware logic, programmable hardware logic, etc.), software (such as instructions that can be executed on a processing device), firmware, or a combination thereof. In one embodiment, machine-executable instructions for the process 401 can be stored in memory 220 of FIG. 2, executed by the processor 210 of FIG. 2, and installed in a data crawling server 130 or a storage server 150 of FIG. 1.

Referring back to FIG. 4, process 401 can be initiated by a user to start the crawling of a hierarchical storage structure. At 410, multiple parallel-processing threads are instantiated. A process is an instance of a computer program being sequentially executed. A thread is a task within one process running simultaneously with other tasks in the same process. Therefore, each process contains one or more tasks (threads) of processing. Instantiation refers to the starting up of the one or more threads. In one embodiment, the number of threads to be instantiated can be configured based on the available CPU, memory, and other system resources. For example, number of threads can be determined by the total available system memory divided by the amount of memory required by a thread and its associated buffer. The number of threads can also be increased or decreased during crawling.

In one embodiment, at 420, a hierarchical storage structure is separated into multiple sections with no missing or overlapping of data. And the leads (identifiers) for the sections are added to a global queue accessible by all the instantiated threads. In one embodiment, the hierarchical storage structure can be divided and parallel-processed based on its logical hierarchy. For example, if the hierarchical storage structure is a file system, then the file system can be separated into multiple sections, each of which is a directory or sub-directory. Alternatively, the hierarchical storage structure can be separated by its physical storage location. For example, the file system can be separated by the physical disks, or sections, etc, on which the data is stored. Thus, a thread might be able to process data physically stored in close proximity. Such approach is advantageous since it reduces the disk seek time and/or rotational delay of the disk head, especially when a file system is highly fragmented.

In one embodiment, when a hierarchical storage structure contains recursive hierarchies, such as a directory may contain directories, or an XML element may contain XML elements, each of the hierarchies or sub-hierarchies can be deemed a potential section for parallel-crawling. In this case, the hierarchical storage structure can be recursively divided into multiple sections, each of which is a recurring substructure in the structure. Recursive division can be performed by a dividing function, during processing of a section of the hierarchical storage structure, to invoke itself or other instances of the same function, for the further dividing of the newly discovered sub-sections of the hierarchical storage structure. For example, during processing of a directory, a recursive dividing function can invoke itself for the dividing of a newly discovered sub-directory within the processing directory, and the newly invoked dividing function can further invoke itself to process sub-directories underneath the newly discovered sub-directory. Alternatively, the hierarchical storage structure can be recursively divided by using a set of parallel-processing threads to discover and process new sub-sections, as further disclosed below. As long as the crawler and its threads are capable of processing one hierarchy, the crawler can equally process the recursive sub-hierarchies, regardless how many levels of hierarchies are in the structure.

In one embodiment, when a hierarchical storage structure is not recursive, but definitive, such as a volume always contains disks, but a disk does not contain a volume, then the hierarchies the crawler is capable of processing can be added as leads into the global queue. If the crawler can process every hierarchical level of a structure, then the crawler and its threads can also recursively divide the non-recursive hierarchical storage structure into multiple sub-sections. For example, if the crawler is capable of processing a storage server, a volume, or a disk etc, then the hierarchical storage structure can be recursively divided into sub-sections based on storage servers, volumes, and/or disks, etc. And the sub-sections of servers, volumes, and disks can all be added to a global queue as leads for further processing.

At 430, concurrently, each of the instantiated threads pulls a lead off the global queue and starts to process the section of the hierarchical storage structure identified by the lead. Sections discovered by the threads can then be added to the global queue as additional leads for further processing. In parallel, each of the threads continuously repeats the above steps of fetching and processing the leads. When there is no lead in the global queue, the idle threads wait, until new leads are added by other processing threads to the global queue. When all leads are processed and no more leads are discovered, the threads can then be terminated.

In one embodiment, at 440, each of the threads collects metadata from the entities found in the corresponding section of the hierarchical storage structure. The metadata is then stored in a memory buffer associated with the thread. Once the memory buffer is full, the entries in the buffer is sorted based on a criterion, and then outputted to a sorted list of metadata. The thread then continues the crawling of the corresponding section of the hierarchical storage structure, and repeats the above activities performed in 430. Contrary to the global queue, the memory buffer is dedicated to each thread, and is not shared among the threads.

In one embodiment, the buffer size is configurable. The bigger a buffer, the more entries can be stored and sorted in memory before being written to a sorted list. However, the buffer size is limited by the total physical memory size and the number of threads. For example, for a system with relatively more physical memory capacity than CPU processing capacity, it is advantageous to instantiate a small number of threads, and give each thread a large memory buffer Likewise, for a system with less memory capacity than CPU capacity, a large number of threads each with a small memory buffer might yield higher performance.

At 450, the sorted lists of metadata generated by multiple threads are merged into a baseline list. In one embodiment, some of the instantiated threads can also perform the merging of the sorted lists. For example, a subset of threads can be pre-assigned to wait for the newly created sorted lists. Similar to the access of the global queue, a thread could first request for a mutual exclusive lock on the global queue or any other shared resource accessible by all threads. Once a lock is obtained, the thread can pick two sorted lists for merging and release the lock on the global queue. The next thread obtained the lock can pick two different sorted lists for merging, and the merged sorted lists can be picked up and further merged with other sorted lists. Alternatively, when there is no lead in the global queue for crawling, a thread can check whether there is more than one sorted list available, and pick two of the sorted lists for merging. Once the threads finished crawling the hierarchical storage structure, and there is no more sorted list to be merged, the remaining sorted list is the baseline list. The baseline list contains sorted metadata for all entries of the hierarchical storage structure.

At 460, the baseline list can be outputted as a representation of the data contained in the hierarchical storage structure. Further analysis can be performed on the baseline list to extract additional summarization information. For example, when the baseline list contains metadata such as file type, file size, etc, an analytical query can be performed to provide a summary of a total storage space usage for each file type. Or, the baseline list can be further sorted based on file size, modification date, etc, in order to obtain detail state information about the data and entities, e.g., largest file, latest updated file, etc, contained in the hierarchical storage structure.

At 470, the newly created baseline list can be compared with a previous baseline list to generate a list of changes, or a delta file, in the hierarchical storage structure since the previous baseline file was generated. At 480, the list of changes can then be further processed according to specific needs. For example, changed entities identified by the delta file can be re-indexed to better reflect the current state of the hierarchical storage structure. Such approach is advantageous since it does not require re-indexing every entity in the hierarchical storage structure. Since many search utilities are based on the indexed entities in providing search results, a fast and resource-efficient crawler is critical for the performance of such applications.

In one embodiment, compared with a conventional crawler, a fast crawler as illustrated in process 401 reduces the time spent to generate a delta file for a hierarchical storage structure. Thus, a user can invoke process 401 more frequently to monitor the real-time or near real-time updates to the hierarchical storage structure. Further, delta files generated from different times can be applied to prior baseline lists to generate Point-In-Time images of the hierarchical storage structure. For example, by applying multiple point-in-time delta files in the same chronological order as they are generated to a prior baseline list, a later baseline list, which represents one point in time for the hierarchical storage structure, can be derived after the changes in the delta files are cumulatively applied to the prior baseline list.

Figure 5:
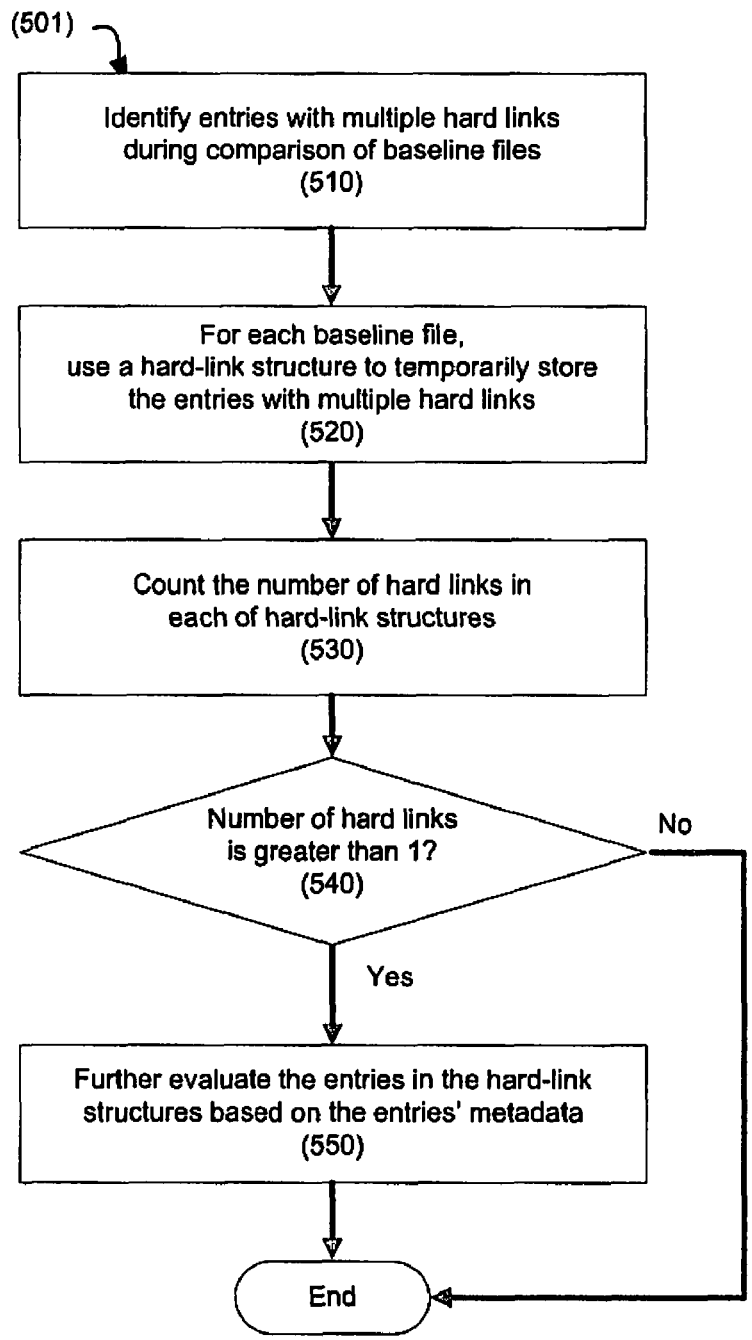
FIG. 5 is a flow diagram showing a process for processing hard link files.

FIG. 5 illustrates a flow diagram of a process 501 for processing hard link entities, in accordance with certain embodiments of the present invention. The process 501 can be performed by processing logic that may comprise hardware (e.g., special-purpose circuitry, dedicated hardware logic, programmable hardware logic, etc.), software (such as instructions that can be executed on a processing device), firmware, or a combination thereof. In one embodiment, machine-executable instructions for the process 501 can be stored in memory 220 of FIG. 2, executed by the processor 210 of FIG. 2, and installed in a data crawling server 130 or a storage server 150 of FIG. 1.

In one embodiment, the hierarchical storage structure contains special entities that require additional processing. For example, there might exist soft link or hard link files in a file-based file system. A soft link, or symbolic link, is a special file that contains a reference to a target file in the form of an absolute or relative path. Programs which read or write a soft link file will behave as if the operation is directly performed on the target file. If the soft link is deleted, the target file remains unaffected. But if the target file is renamed, moved, or deleted, the soft link continues to exist, but points to a file path that is no longer in existence. During crawling, a soft link can be identified and can be treated as a regular file, regardless whether the soft link is pointing to an existing or non-existing target file.

In one embodiment, a hard link is a reference pointing to actual data on a storage system, not pointing to the name or path of a file that is referring to the actual data. Therefore, the same physical data can be referenced by multiple hard link files, each of them having a different file name. Any change via one of the file name reference would be visible from the other hard link references. A hard link count is usually maintained in metadata of a file, keeping track of how many references are pointing to the same data. When a file's hard link count indicates more than one hard link, deleting a file reduces the hard link count by one, and the deleting would not actually render the data inaccessible as long as there exists at least one other reference. In this case, the data can still be referenced via any other remaining hard link references. Since a change in hard link files can give a false indication of an update, during file system crawling, for each entry in the baseline files, additional operations are performed to detect whether there are updates in hard link references.

Referring back to FIG. 5, at 510, during comparison of baseline files to generate a delta file, a piece of data with multiple hard links can be identified and further processed. When using mode number as a sorting criterion, the references, i.e., the hard link files, that point to the same actual data would have the same mode number, and therefore would be grouped into the same sorted area in the baseline files. At 520, two separate hard-link structures, one for each baseline file, are used to store all entries in the corresponding baseline file that have the same mode number. This can be done by scanning the baseline files for the adjacent entries that have the same mode number until encountering a different mode number. The full path information along with any other metadata information can also be stored in the hard link structures.

At 530, after the hard link structures are constructed for both baseline files, the number of entries is separately counted for each of the hard link structures. At 540, if the number of hard links in each of the hard link structures is one, then there are no other references pointing to the same data except the one in the hard link structure. In this case, the normal check for modification is performed. The two hard link structures are cleared of entries. And process 501 proceeds to the end. When the number of entries in either of the two hard link structures is greater than one, then process 501 proceeds to 550. At 550, the entries in the two hard-link structures are further compared based on the entries' metadata, including the full path of the hard link files, etc. If an entry present in the old hard-link structure is not in the new hard-link structure, then a hard link deletion is found. Similarly, if the entry is in the new hard-link structure, but not in the old hard-link structure, then a new hard-link file creation is detected. Further evaluation of these hard-link files, based on metadata, such as modification time, etc, can also be performed. The updates found during hard-link comparison are recorded in the delta file generated during the comparison of the two baseline files. Afterward, process 501 proceeds to the end. The entries in both hard-link structures are cleared for the additional comparison of hard links.

Thus, methods and systems for fast crawling of a hierarchical storage structure have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable/machine-accessible storage medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible storage medium can include recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of crawling a hierarchical storage structure of a data storage system, the method comprising:

recursively dividing the hierarchical storage structure into a plurality of sections, wherein the hierarchical storage structure contains data entities stored by the storage system;

maintaining a queue in the data storage system, the queue containing leads for the plurality of sections to be crawled for metadata;

associating each of the leads with one of a plurality of threads associated with a parallel-processing architecture of the data storage system;

parallel-processing the plurality of sections utilizing the plurality of threads to generate a plurality of sorted lists of metadata, wherein each of the plurality of sorted lists corresponds to a different one of the plurality of sections of the hierarchical storage structure, said parallel-processing the plurality of sections including:

identifying, by each thread, metadata associated with data entities contained in a section associated with the thread;

appending, by the thread, the metadata of each of the data entities as a metadata entry to a metadata list corresponding to the associated section, the metadata list stored in a memory buffer associated with the thread; and sorting, by the thread, the metadata entries within the metadata list of the associated section based on a unique identifier associated with the metadata entry;

merging, by the threads associated with each of the plurality of sections, corresponding sorted lists of metadata to form a baseline list, wherein the baseline list contains sorted metadata for the data entities of the hierarchical storage structure; and outputting a representation of the baseline list, as a result of the crawling, to indicate a state of the data entities stored by the storage system.

2. The method as recited in claim 1, further comprising: generating a list of changes to the hierarchical storage structure by comparing the baseline list with a previous baseline list of the hierarchical storage structure, wherein the list of changes contains data entities of the hierarchical storage structure that have been updated between the baseline list and the previous baseline list.

3. The method as recited in claim 1, wherein the hierarchical storage structure is a file system, and the data entities contained in the hierarchical storage structure are files or directories of the file system.

4. The method as recited in claim 3, wherein the sorted metadata for the files contains inode numbers, full path names, and modification times.

5. The method as recited in claim 3, wherein said recursively dividing of the file system comprises recursively discovering subdirectories in the file system and dividing the file system based on the discovered subdirectories.

6. The method as recited in claim 5, wherein said recursively dividing of the file system further comprises recursively discovering additional subdirectories in the subdirectories and dividing the file system based on the discovered additional subdirectories.

7. The method as recited in claim 5, wherein said recursively dividing of the file system further comprises adding leads for the discovered additional subdirectories to a global queue, and the leads are accessed by a plurality of threads for further recursively dividing of the file system.

8. The method as recited in claim 1, further comprising: instantiating a plurality of parallel-processing threads for the parallel-processing of the plurality of sections.

9. The method as recited in claim 8, wherein the merging of the sorted lists of metadata is performed by the plurality of parallel-processing threads.

10. The method as recited in claim 8, wherein the number of the plurality of parallel-processing threads is determined according to a memory size of a processing system divided by a memory buffer size used by each of the plurality of parallel-processing threads.

11. The method as recited in claim 1, wherein the method is embodied in a machine-readable storage medium as a set of instructions which, when executed by a processor, cause the processor to perform the method.

12. A method of crawling a network file system of a network storage server, the method comprising:

maintaining a queue in the network file system, wherein the network file system manages entities stored in the network storage server, and the queue contains leads for a plurality of sections of the network file system to be crawled for metadata;

associating each lead with one of a plurality of threads associated with a parallel-processing architecture of the network storage server;

processing the leads with a plurality of parallel-processing threads, wherein each of the plurality of threads selects one section from the plurality of sections at a time for processing;

selecting each lead from the queue, and for each lead:

assigning the lead to be processed by one of the threads of the plurality of the threads, scanning, by the assigned thread, a section identified by the lead for entities contained in the section;

storing, by the assigned thread, metadata for each of the entities contained in the section to a memory buffer;

upon the memory buffer being full, sorting, by the assigned thread, metadata stored in the memory buffer and saving the sorted metadata to a sorted list, wherein the sorting is based on a unique identifier associated with the metadata; and merging, by the threads associated with each of the leads, corresponding saved sorted lists to a baseline list, wherein the baseline list contains metadata for all entities of the network file system.

13. The method as recited in claim 12, further comprising: recursively dividing entities managed by the network file system into the plurality of sections, wherein each of the plurality of sections is further recursively divided into a plurality of sub-sections, and leads for the plurality of sub-sections can be added to the queue.

14. The method as recited in claim 12, further comprising: generating a list of updated entities in the network file system by detecting updates between the baseline list and a previously generated baseline list of the network file system.

15. The method as recited in claim 14, further comprising: upon detecting an entry in the baseline list with multiple hard links, using full path of the entry to detect updates.

16. The method as recited in claim 12, wherein said selecting a lead from the queue further comprises:

obtaining a lock to the queue;
choosing a first lead as the selected lead from the queue;
removing the first lead from the queue; and
releasing the lock to the queue.

17. The method as recited in claim 12, wherein a plurality of threads parallel-performs the method.

18. The method as recited in claim 12, wherein said merging of the saved sorted lists is parallel-processed by a plurality of threads.

19. The method as recited in claim 12, wherein the method is embodied in a machine-readable medium as a set of instructions which, when executed by a processor, cause the processor to perform the method.

20. A system comprising:

a processor;

a network interface through which to communicate with a network file system; and a memory coupled with the processor, the memory storing instructions which, when executed by the processor, cause the system to perform a process comprising:

recursively dividing data in the network file system into a plurality of sections, wherein the network file system contains data stored in a network storage server;

maintaining a queue in the data storage system, the queue containing leads for the plurality of sections to be crawled for metadata;

processing the leads with a plurality of parallel-processing threads, wherein each of the plurality of threads selects one section from the plurality of sections at a time for processing, said processing the plurality of sections including:

identifying, by a thread assigned to a particular section, metadata associated with data entities contained in the particular section;

appending, by the thread, the metadata of each of the data entities as a metadata entry to a metadata list corresponding to the particular section, the metadata list stored in a memory buffer associated with the thread; and sorting, by the thread, the metadata entries within the metadata list of the particular section based on a unique identifier associated with the metadata entry; and merging, by the threads associated with each of the plurality of sections, corresponding sorted lists of metadata generated by the plurality of threads to a baseline list, wherein the baseline list contains sorted metadata for the data in the network file system.

21. The system as recited in claim 20, wherein the process further comprising:

generating a list of changes to the network file system by comparing the baseline list with a previous baseline list of the network file system, wherein the list of changes contains entities in the network file system that have been updated since the previous baseline list was generated; and indexing updated entities identified by the list of changes in the network file system.

22. The system as recited in claim 20, wherein said merging of the sorted lists is parallel-processed by the plurality of threads.

* * * * *